United States Patent
Shih et al.

(10) Patent No.: US 8,436,959 B2
(45) Date of Patent: May 7, 2013

(54) LIQUID CRYSTAL DISPLAY AND FABRICATION METHOD THEREOF

(75) Inventors: Wei-Tong Shih, Huatan Township, Changhua County (TW); Cheng-Chia Wu, Banqiao (TW)

(73) Assignee: Hannstar Display Corp., New Taipei (TW)

( * ) Notice: Subject to any disclaimer, the term of this patent is extended or adjusted under 35 U.S.C. 154(b) by 287 days.

(21) Appl. No.: 12/980,623

(22) Filed: Dec. 29, 2010

(65) Prior Publication Data

US 2011/0157520 A1 Jun. 30, 2011

(30) Foreign Application Priority Data

Dec. 31, 2009 (TW) .............................. 98146334 A

(51) Int. Cl.
G02F 1/1335 (2006.01)
(52) U.S. Cl.
USPC .................................. 349/61; 349/57; 349/97
(58) Field of Classification Search .................. 349/57, 349/61, 97
See application file for complete search history.

(56) References Cited

U.S. PATENT DOCUMENTS

| | | | | |
|---|---|---|---|---|
| 6,104,446 A * | 8/2000 | Blankenbecler et al. | ......... | 349/5 |
| 7,164,454 B2 * | 1/2007 | Numata et al. | .................. | 349/95 |
| 7,808,577 B2 * | 10/2010 | Kimura | ........................... | 349/65 |
| 7,808,704 B2 * | 10/2010 | Taira et al. | ..................... | 359/569 |
| 8,305,527 B2 * | 11/2012 | Lee et al. | ...................... | 349/106 |

FOREIGN PATENT DOCUMENTS

| | | |
|---|---|---|
| CN | 101261386 | 9/2008 |
| TW | 200426495 | 12/2004 |
| TW | 200706921 | 2/2007 |

OTHER PUBLICATIONS

Chinese language office action dated Dec. 23, 2011.
English language translation of abstract of CN 101261386 (published Sep. 10, 2008).
Taiwanese language office action dated Oct. 30, 2012.
English language translation of abstract of TW 200426495 (published Dec. 1, 2004).
English language translation of abstract of TW 200706921 (published Feb. 16, 2007).

* cited by examiner

*Primary Examiner* — Mike Qi
(74) *Attorney, Agent, or Firm* — McClure, Qualey & Rodack, LLP

(57) ABSTRACT

A liquid crystal display and a fabrication method thereof are provided. The liquid crystal display includes a liquid crystal display panel having a plurality of pixels. A backlight module is disposed under the liquid crystal display panel. A lens is disposed between the liquid crystal display panel and the backlight module, having a plurality of optical structures formed on an upper surface and a lower surface thereof. The lens can disperse lights from the backlight module to form a plurality of chromatic light sources, wherein each chromatic light source is composed of colored lights with a continuous spectrum formed from a red light to a violet light and corresponds to each pixel.

19 Claims, 4 Drawing Sheets

LIQUID CRYSTAL DISPLAY AND FABRICATION METHOD THEREOF

CROSS REFERENCE TO RELATED APPLICATIONS

This application claims priority of Taiwan Patent Application No. 098146334, filed on Dec. 31, 2009, the entirety of which is incorporated by reference herein.

BACKGROUND OF THE INVENTION

1. Field of the Invention

The invention relates to a liquid crystal display, and more particularly to a liquid crystal display having a lens and without a color filter and a fabrication method thereof.

2. Description of the Related Art

When conventional liquid crystal displays are operated, a white light from a backlight module is dispersed by a color filter to form a red light, a green light and a blue light. Then, the red light, the green light and the blue light are mixed to achieve a color display. Referring to FIG. 1, a cross section of a conventional liquid crystal display is shown. A backlight module 10 is disposed under a liquid crystal display panel 14, and a lower polarizer 12 is disposed between the backlight module 10 and the liquid crystal display panel 14. A color filter 16 is disposed above the liquid crystal display panel 14. The color filter 16 has tricolor photo resists, including a red photo resist 16R, a green photo resist 16G and a blue photo resist 16B, respectively. The white light from the backlight module 10 passes through the lower polarizer 12 and the liquid crystal display panel 14, and then passes through the color filter 16 to form tricolor light, including a red light, a green light and a blue light, independently.

The photo resists of the color filter 16 absorb a large portion of light energy from light; such that after light passes through the color filter 16, only about 30% of the light energy exits from the color filter 16. Thus, efficient use of light energy for conventional liquid crystal displays is low. Also, because the cost of color filters is high, it is difficult to reduce fabrication cost of conventional liquid crystal displays.

Therefore, a liquid crystal display that does not need a color filter to achieve color display is desired.

BRIEF SUMMARY OF THE INVENTION

An embodiment of the invention provides a liquid crystal display. The liquid crystal display comprises a liquid crystal display panel having a plurality of pixels. A backlight module is disposed under the liquid crystal display panel. A lens is disposed between the liquid crystal display panel and the backlight module, having a plurality of optical structures formed on an upper surface and a lower surface of the lens. The optical structures of the lens can disperse light from the backlight module to form a plurality of chromatic light sources, wherein each chromatic light source is composed of colored lights with a continuous spectrum formed from a red light to a violet light and each chromatic light source corresponds to each pixel.

Further, an embodiment of the invention provides a method for fabricating a liquid crystal display. The method comprises: providing a liquid crystal display panel having a plurality of pixels; disposing a backlight module under the liquid crystal display panel; and attaching a lens under the liquid crystal display panel, facing the backlight module, wherein the lens has a plurality of optical structures formed on an upper surface and a lower surface of the lens, such that a light from the backlight module is dispersed to form a plurality of chromatic light sources, wherein each chromatic light source is composed of colored lights with a continuous spectrum formed from a red light to a violet light and each chromatic light source corresponds to each pixel.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

In an embodiment of the invention, a liquid crystal display without a color filter is provided. A lens is used in the liquid crystal display to achieve color display.

Figure 1:
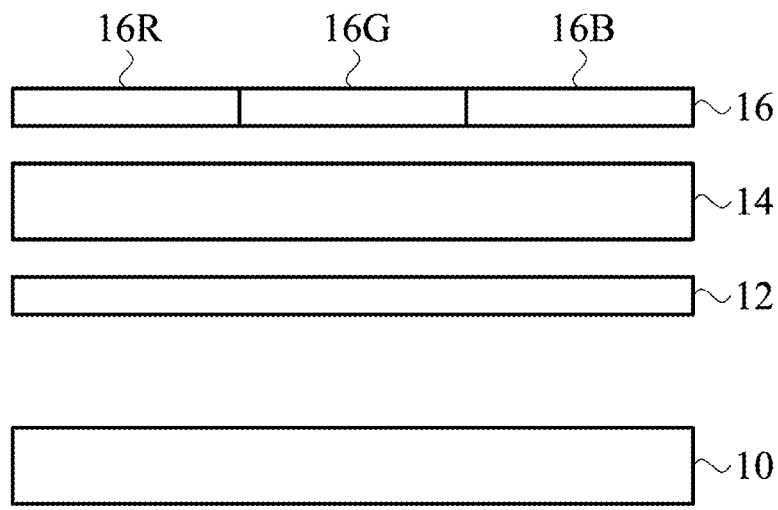
FIG. 1 shows a schematic cross section of a conventional liquid crystal display.
Figure 2A:
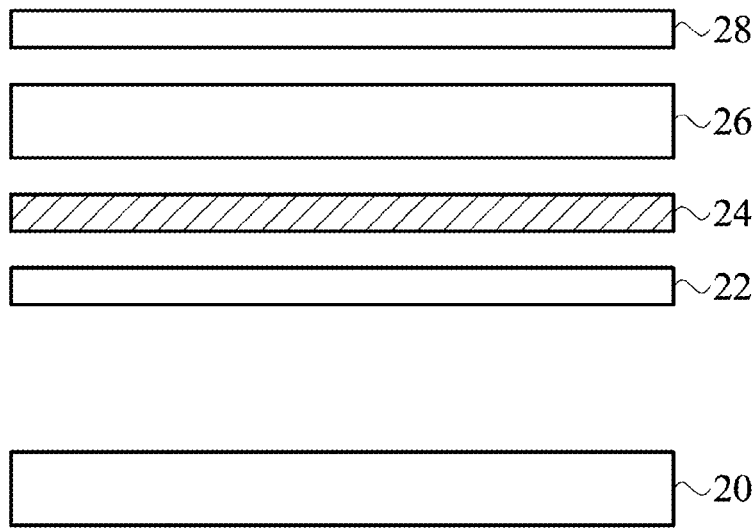
FIG. 2A shows a schematic cross section of a liquid crystal display according to an embodiment of the invention.

Referring to FIG. 2A, a cross section of a liquid crystal display according to an embodiment of the invention is shown. First, a liquid crystal display panel 26 is provided. The liquid crystal display panel 26 includes an upper substrate, a lower substrate and a liquid crystal layer disposed between the upper substrate and the lower substrate. The upper substrate and the lower substrate may be glass substrates. A thin-film transistor (TFT) array is formed on the lower substrate. Further, a plurality of scan lines and a plurality of data lines vertical to the scan lines are formed on the lower substrate, wherein any two adjacent scan lines and any two adjacent data lines define one sub-pixel. In an embodiment, one pixel is composed of three sub-pixels and the three sub-pixels are a red sub-pixel, a green sub-pixel and a blue sub-pixel, respectively. The liquid crystal display panel 26 has a plurality of pixels (not shown). In another embodiment, one pixel may be composed of more than three sub-pixels, such as a red sub-pixel, a green sub-pixel, a blue sub-pixel and a yellow sub-pixel, respectively.

A backlight module 20 is disposed under the liquid crystal display panel 26. In an embodiment, the backlight module 20 can provide a white light for the liquid crystal display panel 26. Moreover, the liquid crystal display further includes a pair of polarizers, including an upper polarizer 28 and a lower polarizer 22 to sandwich the liquid crystal display panel 26. It is noted that according to an embodiment of the invention, a lens 24 is disposed between the liquid crystal display panel 26 and the lower polarizer 22. An upper surface and a lower surface of the lens 24 have a plurality of optical structures formed thereon. The optical structures of the lens can disperse the white light originating from the backlight module 20 to form a plurality of chromatic light sources, wherein each chromatic light source is composed of colored lights with a continuous spectrum formed from a red light to a violet light and each chromatic light source corresponds to each pixel of the liquid crystal display panel 26. In an embodiment, each pixel includes three sub-pixels and each chromatic light source displays a red light, a green light and a blue light, respectively, in the sub-pixels of each of the pixels, such that color display is achieved. In another embodiment, each pixel includes more than three sub-pixels and each chromatic light source displays a red light, a green light, a blue light and a yellow light, respectively, in the sub-pixels of each of the pixels, such that color display is achieved. Thus, according to the embodiments of the invention, the liquid crystal displays do not need a color filter to achieve color display.

Figure 2B:
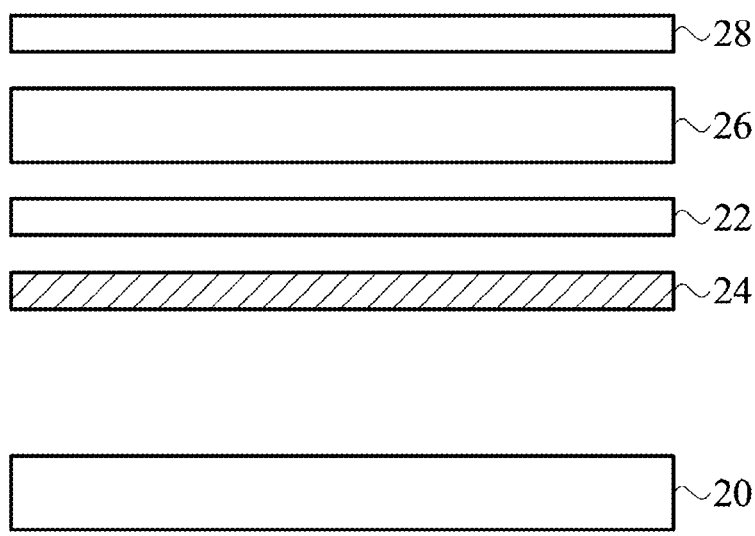
FIG. 2B shows a schematic cross section of a liquid crystal display according to another embodiment of the invention.

Further, referring to FIG. 2B, a cross section of a liquid crystal display according to another embodiment of the invention is shown. The difference between the liquid crystal displays of FIG. 2A and FIG. 2B is that the lens 24 is disposed between the lower polarizer 22 and the backlight module 20 in FIG. 2B. Similarly, in the liquid crystal display of FIG. 2B, a white light from the backlight module 20 is dispersed by the lens 24 to form a plurality of chromatic light sources, and each chromatic light source corresponds to each pixel of the liquid crystal display panel 26 to achieve color display.

Figure 3:
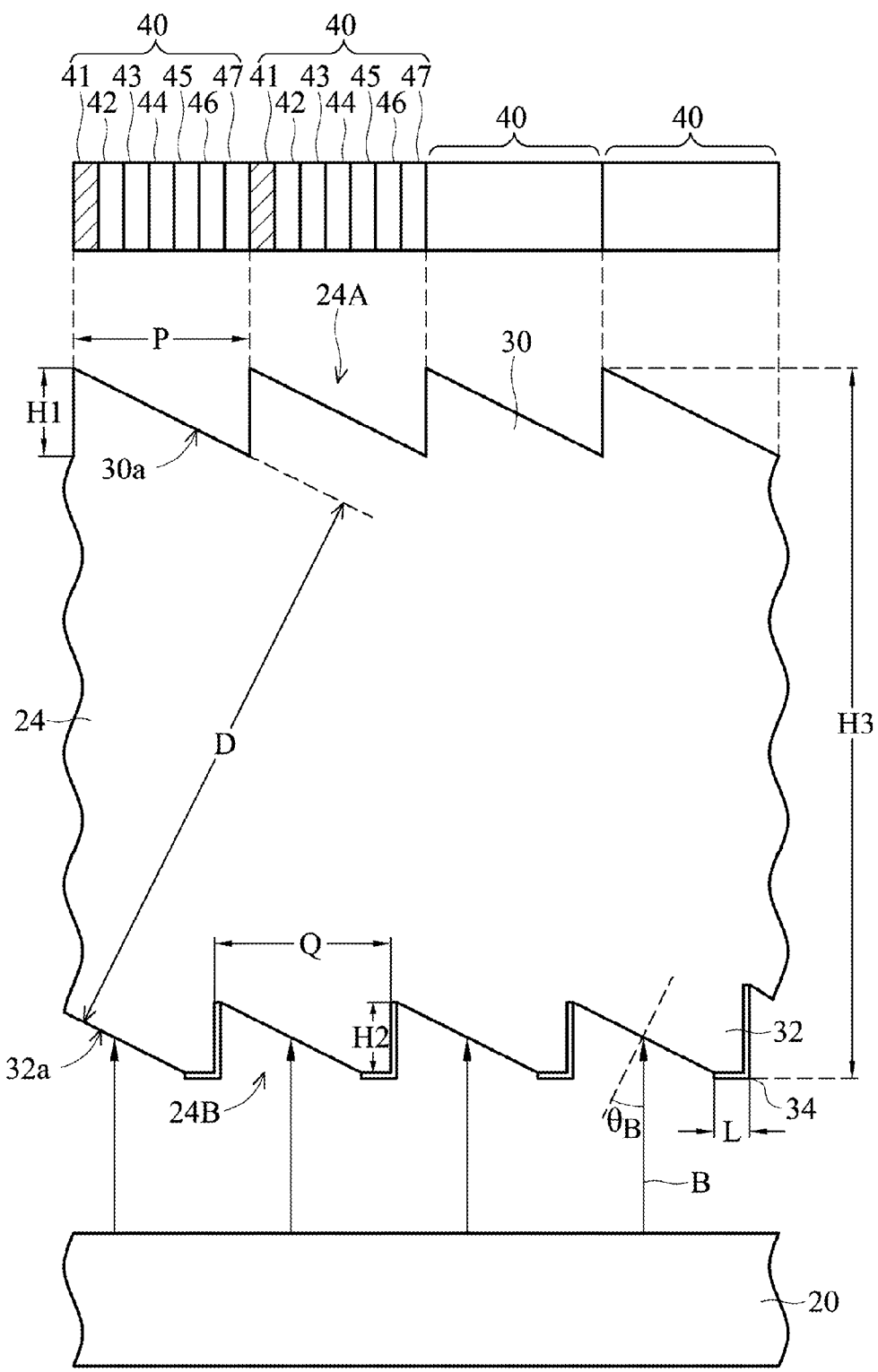
FIG. 3 shows a schematic cross section of a lens, and a schematic view of lights from a backlight module entering the lens according to an embodiment of the invention.

Next, referring to FIG. 3, a cross section of a lens 24 and a schematic view of lights from a backlight module 20 entering the lens 24 according to an embodiment of the invention are shown. In this embodiment, the upper surface 24A and the lower surface 24B of the lens 24 have a plurality of N-shaped optical structures 30 and a plurality of N-shaped optical structures 32, respectively. In other word, the optical structures 30 on the upper surface 24A of the lens 24 have an N-shaped zigzag shape and the optical structures 32 on the lower surface 24B of the lens 24 also have an N-shaped zigzag shape. An included angle between the direction of a light B, for example a white light, originating from the backlight module 20 and a direction perpendicular to a light input surface of the lens 24, is a Brewster angle $\theta_B$, such that maximum transmission of the light B, originating from the backlight module 20 and passing through the lens 24, is achieved. The Brewster angle $\theta_B$ is determined by the material of the lens 24. The material of the lens 24 is a transparent material, for example glass. The Brewster angle $\theta_B$ of glass is 56.3 degrees. Because the included angle between the direction of the light B from the backlight module 20 and the direction perpendicular to the light input surface of the lens 24 is a Brewster angle $\theta_B$ and is combined with the lower polarizer 22, maximum transmission of transverse magnetic (TM) polarized light is achieved.

Because the optical structures 30 and 32 on the upper and the lower surfaces of the lens 24 have a prism chromatic dispersion function, the white light originating from the backlight module 20 is dispersed to form a plurality of chromatic light sources 40, and each chromatic light source 40 corresponds to each pixel of the liquid crystal display panel 26. Each of the chromatic light sources 40 is composed of colored lights with a continuous spectrum formed from a red light to a violet light, including a red light, an orange light, a yellow light, a green light, a blue light, an indigo light and a violet light as shown as reference numbers 41 to 47 in FIG. 3.

In an embodiment, the N-shaped optical structures 30 on the upper surface of the lens 24 have a pitch P substantially equal to a width of one pixel of the liquid crystal display panel 26. The N-shaped optical structure 30 has a height H1 substantially equal to $P*\tan\theta_B$. The N-shaped optical structures 32 on the lower surface of the lens 24 have a pitch Q smaller than a width of one pixel of the liquid crystal display panel 26, and the N-shaped optical structure 32 has a height H2 substantially equal to $Q*\tan\theta_B$. The surfaces 30a of the N-shaped optical structures 30 on the upper surface of the lens 24 are parallel to the surfaces 32a of the N-shaped optical structures 32 on the lower surface of the lens 24, i.e. a light input surface and a light output surface of the lens 24 for the light B passing through are parallel with each other. In an embodiment, a distance D between the surface 30a of the N-shaped optical structure 30 and the surface 32a of the N-shaped optical structure 32 is between about 0.2 cm and about 2 cm. A thickness H3 of the lens 24 is substantially equal to $(D*\cos\theta_B)+H1+H2$.

According to an embodiment of the invention, the optical structures on the upper and the lower surfaces of the lens 24 can be formed by a photolithography and etching process. First, a substrate is provided. The material of the substrate is a transparent material, for example a glass. Then, a photo resist is coated on an upper surface of the substrate and a photo resist is coated on a lower surface of the substrate. A gray level mask is disposed over the photo resist on the upper surface of the substrate and a gray level mask is disposed over the photo resist on the lower surface of the substrate. Then, an exposure and a development process are performed to form a patterned photo resist on the upper surface of the substrate and form a patterned photo resist on the lower surface of the substrate. The patterned photo resists on the upper and the lower surfaces of the substrate correspond to the optical structures on the upper and the lower surfaces of the lens 24, respectively. Next, the upper and the lower surfaces of the substrate are etched through the patterned photo resists to form the N-shaped optical structures 30 and 32 as shown in FIG. 3. Next, the patterned photo resists are removed to complete fabrication of the lens 24.

In another embodiment, the optical structures on the upper and the lower surfaces of the lens 24 are formed from photo resists. First, a transparent substrate, for example a glass substrate is provided. Then, a photo resist having a refractive index substantially equal to a refractive index of the glass substrate is selected to coat on an upper surface and a lower surface of the glass substrate. Next, a gray level mask is disposed over the photo resist on the upper surface of the glass substrate and a gray level mask is disposed over the photo resist on the lower surface of the glass substrate for performing an exposure and a development process. Then, a patterned photo resist is formed on the upper surface of the glass substrate and a patterned photo resist is formed on the lower surface of the substrate to be the optical structures on the upper and the lower surfaces of the lens 24. In this embodiment, the patterned photo resists on the upper and the lower surfaces of the glass substrate are not removed to form the optical structures on the upper and the lower surfaces of the lens 24.

In the embodiments of the invention, each pixel of the liquid crystal display panel 26 includes three or more than three sub-pixels, and the sub-pixels may be a red sub-pixel, a green sub-pixel, a blue sub-pixel, a yellow sub-pixel, etc., independently. Therefore, a portion of the colored lights in the chromatic light sources 40 needs to be shielded, and other portions of the colored lights required for the sub-pixels of the liquid crystal display panel 26 do not need to be shielded. In an embodiment, a black matrix (BM) layer (not shown) is formed in the liquid crystal display panel 26, such that the portion of the colored lights in the chromatic light sources 40 that is not needed for the sub-pixels is shielded by the black matrix layer.

Moreover, a light shielding layer 34 can be formed between the N-shaped optical structures 32 on the lower surface 24B of the lens 24. The material of the light shielding layer 34 may be a light absorbent material or a light reflective material. The plurality of chromatic light sources 40 can be isolated by the light shielding layer 34 to prevent the plurality of chromatic light sources 40 from mixing together. The light shielding layer 34 is disposed to cover the sidewalls between the N-shaped optical structures 32 and on a portion of the lower surface 24B of the lens 24. The portion of the lower surface 24B of the lens 24 covered with the light shielding layer 34 has a width L substantially equal to a width of the black matrix layer disposed between the sub-pixels of the liquid crystal display panel 26.

According to an embodiment of the invention, the light shielding layer 34 on the optical structures of the lower surface of the lens 24 may be formed by a photolithography and etching process. First, a light shielding material is coated on the optical structures of the lower surface of the lens 24. Then, a photo resist is coated on the light shielding material and a photo mask is disposed over the photo resist for performing an exposure and a development process to form a patterned photo resist on the light shielding material, wherein the patterned photo resist corresponds to the pattern of the light shielding layer 34. Then, the light shielding material is etched through the patterned photo resist to form the light shielding layer 34 as shown in FIG. 3.

As shown in the embodiment of FIG. 3, each chromatic light source 40 corresponds to each pixel of the liquid crystal display panel 26. Each color light of the chromatic light source 40 needs to be accurately aligned with each sub-pixel of liquid crystal display panel 26. In an embodiment of the invention, several alignment marks are formed on the lens 24 and on the lower substrate of the liquid crystal display panel 26. The alignment marks on the lens 24 are aligned with the alignment marks on the liquid crystal display panel 26 by a mechanical alignment method. Then, the lens 24 is attached to the liquid crystal display panel 26.

Figure 4:
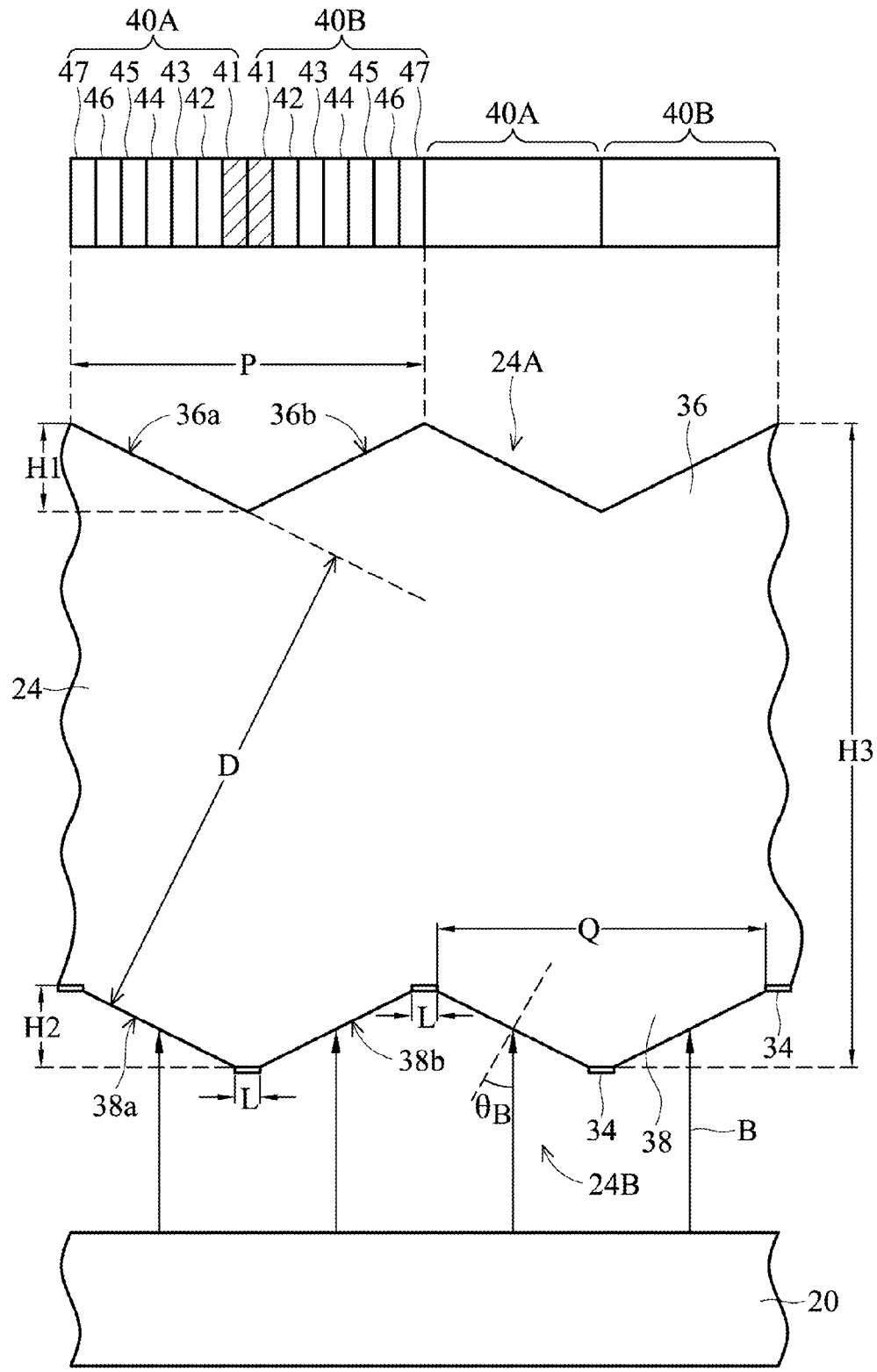
FIG. 4 shows a schematic cross section of a lens and a schematic view of lights from a backlight module entering the lens according to another embodiment of the invention.

When the alignment of the alignment marks on the lens 24 and on the liquid crystal display panel 26 is not accurate, colored light of a different color is displayed in each sub-pixel of the liquid crystal display panel 26. For example, a colored light for a red sub-pixel is shifted toward a longer wavelength, such that a portion of the colored light of the red sub-pixel is mixed with an orange light to cause color shift. In order to reduce the color shift caused by the alignment issue, in an embodiment of the invention, another type of lens is provided for the liquid crystal displays. Referring to FIG. 4, a cross section of a lens 24 and a schematic view of lights from a backlight module 20 entering the lens 24 according to another embodiment of the invention are shown. The difference between the lens 24 of FIG. 3 and the lens 24 of FIG. 4 is that optical structures 36 and 38 on the upper surface 24A and the lower surface 24B of the lens 24 in FIG. 4 are V-shaped optical structures. In other word, the optical structures 36 on the upper surface 24A of the lens 24 have a V-shaped zigzag shape and the optical structures 38 on the lower surface 24B of the lens 24 also have a V-shaped zigzag shape. Similarly, an included angle between the direction of the white light B originating from the backlight module 20 and a direction, perpendicular to a light input surface of the lens 24 is a Brewster angle $\theta_B$.

In an embodiment, the V-shaped optical structures 36 on the upper surface of the lens 24 have a pitch P substantially equal to a width of one pixel of the liquid crystal display panel 26. The V-shaped optical structure 36 has a height H1 substantially equal to $P^*\tan\theta_B$. The V-shaped optical structures 38 on the lower surface of the lens 24 have a pitch Q smaller than a width of one pixel of the liquid crystal display panel 26, and the V-shaped optical structure 38 has a height H2 substantially equal to $Q^*\tan\theta_B$. The surfaces 36a of the V-shaped optical structures 36 on the upper surface of the lens 24 are parallel to the surfaces 38a of the V-shaped optical structures 38 on the lower surface of the lens 24. The surfaces 36b of the V-shaped optical structures 36 on the upper surface of the lens 24 are parallel to the surfaces 38b of the V-shaped optical structures 38 on the lower surface of the lens 24. In another word, a light input surface and a light output surface of the lens 24 for the light B passing through are parallel with each other. In an embodiment, a distance D between the surface 36a of the V-shaped optical structure 36 and the surface 38a of the V-shaped optical structure 38 is between about 0.3 cm and about 2 cm. A thickness H3 of the lens 24 is substantially equal to $(D^*\cos\theta_B)+H1+H2$.

Moreover, a light shielding layer 34 is formed between the V-shaped optical structures 38 on the lower surface 24B of the lens 24 and on tips of the V-shaped optical structures 38. The material of the light shielding layer 34 may be a light absorbent material or a light reflective material. The plurality of chromatic light sources 40A and 40B can be isolated by the light shielding layer 34 to prevent the plurality of chromatic light sources 40A and 40B from mixing together. The light shielding layer 34 is disposed to cover a portion of the V-shaped optical structures 38 on the lower surface 24B of the lens 24. The portion of the V-shaped optical structures 38 on the lower surface 24B of the lens 24 covered with the light shielding layer 34 has a width L substantially equal to a width of the black matrix layer disposed between the sub-pixels of the liquid crystal display panel 26.

In the embodiment of FIG. 4, two chromatic light sources 40A and 40B correspond to each pixel of the liquid crystal display panel 26. The white light B originating from the backlight module 20 is dispersed by the V-shaped optical structures 36 and 38 of the lens 24 to form two chromatic light sources 40A and 40B, wherein a red light 41 of the chromatic light source 40A is adjacent to a red light 41 of the chromatic light source 40B. In this embodiment, each pixel of the liquid crystal display panel 26 has six sub-pixels. The six sub-pixels are arranged symmetrically, for example arranged in a sequence such as a blue sub-pixel, a green sub-pixel, a red sub-pixel, a red sub-pixel, a green sub-pixel and a blue sub-pixel sequence. When inaccurate alignment occurs, a colored light of the red sub-pixel on the right side is shifted toward a long wavelength, and a colored light of the red sub-pixel on the left side is shifted toward a short wavelength. The sub-pixel on the right side and the sub-pixel on the left side can be used for compensation to reduce color shift. The compensation is referred to as a color mixing compensation in primary colors. Also, by using the structure of the lens 24 as shown in FIG. 4, color mixing compensation for other wave bands may be achieved. Therefore, color shift in each sub-pixel of the liquid crystal display panel 26 may be reduced.

As the above mentions, in the embodiments of the invention, a lens of a liquid crystal display can separate wavelengths of light, such that the white light originating from the backlight module is dispersed to form a plurality of chromatic light sources. Further, a red light, a green light and a blue light of the chromatic light source can be used to achieve color display. Thus, the lens can be substituted for a color filter; thus, achieving a liquid crystal display without a color filter.

Moreover, according to the embodiments of the invention, the liquid crystal displays have the following advantage. Notably, light energy is more efficiently transferred for the liquid crystal display without a color filter than that of a liquid crystal display with a color filter. Note that light energy loss of the lens of the liquid crystal display without a color filter is almost zero, when the direction of the light from the backlight module and the normal direction perpendicular to the light entering surface of the lens have an included Brewster angle $\theta_B$. Accordingly, over 70% of the original light energy may be transferred through the liquid crystal display without a color filter. Also, without color filters, contrast ratio of liquid crystal displays would not be reduced by dye molecules of color filters affecting polarized light. Moreover, the color gamut of the liquid crystal displays without a color filter may be increased as the different chromatic light sources of the colored lights may be easily expanded.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
   a liquid crystal display panel, having a plurality of pixels;
   a backlight module disposed under the liquid crystal display panel;
   a lens disposed between the liquid crystal display panel and the backlight module, wherein the lens has a plurality of optical structures formed on an upper surface and a lower surface of the lens for dispersing light from the backlight module to form a plurality of chromatic light sources, and each chromatic light source is composed of colored lights with a continuous spectrum formed from a red light to a violet light and each chromatic light source corresponds to each pixel; and
   a light shielding layer disposed between the optical structures on the lower surface of the lens.

2. The liquid crystal display as claimed in claim 1, further comprising a pair of polarizers, including an upper polarizer and a lower polarizer, sandwiching the liquid crystal display panel, wherein the lower polarizer faces the backlight module.

3. The liquid crystal display as claimed in claim 2, wherein the lens is disposed between the liquid crystal display panel and the lower polarizer.

4. The liquid crystal display as claimed in claim 2, wherein the lens is disposed between the lower polarizer and the backlight module.

5. The liquid crystal display as claimed in claim 1, wherein an included angle between the direction of the light from the backlight module and a direction perpendicular to a light input surface of the lens is a Brewster angle $\theta_B$.

6. The liquid crystal display as claimed in claim 1, wherein a light input surface and a light output surface of the optical structures on the upper surface and the lower surface of the lens for light passing through are parallel with each other.

7. The liquid crystal display as claimed in claim 1, wherein a pitch between the optical structures on the upper surface of the lens is substantially equal to a width of the pixel, and a pitch between the optical structures on the lower surface of the lens is smaller than the width of the pixel.

8. The liquid crystal display as claimed in claim 1, wherein the optical structures on the upper surface and the lower surface of the lens have an N-shaped zigzag or a V-shaped zigzag shape.

9. The liquid crystal display as claimed in claim 1, wherein the liquid crystal display panel further comprises a black matrix layer, and a portion of the chromatic light source is shielded by the black matrix layer.

10. The liquid crystal display as claimed in claim 9, wherein the light shielding layer has a width equal to a width of the black matrix layer.

11. The liquid crystal display as claimed in claim 1, wherein the optical structures on the lower surface of the lens have an N-shaped zigzag shape, and the light shielding layer is disposed between the N-shaped optical structures to cover a portion of the N-shaped optical structure between two adjacent N-shaped optical structures.

12. The liquid crystal display as claimed in claim 1, wherein the optical structures on the lower surface of the lens have a V-shaped zigzag shape, and the light shielding layer is disposed between the V-shaped optical structures to cover a portion of the V-shaped optical structure between two adjacent V-shaped optical structures and a tip of the V-shaped optical structure.

13. The liquid crystal display as claimed in claim 1, wherein the optical structures on the upper surface and the lower surface of the lens have an N-shaped zigzag shape, and each of the N-shaped optical structures forms one chromatic light source to correspond with each pixel.

14. The liquid crystal display as claimed in claim 13, wherein each of the pixels comprises three or more than three sub-pixels, and the colors of the sub-pixels are red, green and blue, respectively, or red, green, blue and yellow, respectively.

15. The liquid crystal display as claimed in claim 1, wherein the optical structures on the upper surface and the lower surface of the lens have a V-shaped zigzag shape, and each of the V-shaped optical structures forms two of the chromatic light sources to correspond with each pixel.

16. The liquid crystal display as claimed in claim 15, wherein each of the pixels comprises six sub-pixels, and the colors of the six sub-pixels are blue, green, red, red, green and blue, respectively.

17. A method for fabricating a liquid crystal display, comprising:
   providing a liquid crystal display panel, having a plurality of pixels;
   disposing a backlight module under the liquid crystal display panel; and
   attaching a lens under the liquid crystal display panel, facing the backlight module, wherein the lens has a plurality of optical structures formed on an upper surface and a lower surface of the lens for dispersing light from the backlight module to form a plurality of chromatic light sources, and each chromatic light source is composed of colored lights with a continuous spectrum formed from a red light to a violet light and each chromatic light source corresponds to each pixel; and
   forming a light shielding layer between the optical structures on the lower surface of the lens.

18. The method as claimed in claim 17, wherein the method for forming the optical structures on the upper surface and the lower surface of the lens comprises;
   providing a glass substrate;
   coating a first photo resist on an upper surface of the glass substrate and a second photo resist on a lower surface of the glass substrate;
   providing a first gray level mask over the first photo resist and providing a second gray level mask over the second photo resist, and performing an exposure and a development process to form a first patterned photo resist on the upper surface of the glass substrate and form a second patterned photo resist on the lower surface of the glass substrate; and
   etching the upper surface and the lower surface of the glass substrate through the first patterned photo resist and the second patterned photo resist, respectively, to form the optical structures on the upper surface and the lower surface of the lens.

19. The method as claimed in claim 17, wherein the method for forming the optical structures on the upper surface and the lower surface of the lens comprises;

providing a glass substrate;

coating a first photo resist on an upper surface of the glass substrate and a second photo resist on a lower surface of the glass substrate;

providing a first gray level mask over the first photo resist and providing a second gray level mask over the second photo resist, and performing an exposure and a development process to form a first patterned photo resist on the upper surface of the glass substrate and form a second patterned photo resist on the lower surface of the glass substrate, wherein the first patterned photo resist and the second patterned photo resist are the optical structures on the upper surface and the lower surface of the lens.

* * * * *